US008185215B2

(12) United States Patent
Burchard et al.

(10) Patent No.: US 8,185,215 B2
(45) Date of Patent: May 22, 2012

(54) ELECTRONIC DEVICE AND METHOD DETERMINING A WORKLOAD OF AN ELECTRONIC DEVICE

(75) Inventors: Artur T. Burchard, Eindhoven (NL);
Rinze I. M. P. Meijer, Herkenbosch (NL)

(73) Assignee: Nytell Software LLC, Wilmington, DE (US)

( * ) Notice: Subject to any disclaimer, the term of this patent is extended or adjusted under 35 U.S.C. 154(b) by 421 days.

(21) Appl. No.: 12/531,726

(22) PCT Filed: Mar. 26, 2008

(86) PCT No.: PCT/IB2008/051124
§ 371 (c)(1),
(2), (4) Date: Sep. 17, 2009

(87) PCT Pub. No.: WO2008/117248
PCT Pub. Date: Oct. 2, 2008

(65) Prior Publication Data
US 2010/0087964 A1    Apr. 8, 2010

(30) Foreign Application Priority Data

Mar. 28, 2007 (EP) .................................... 07105151

(51) Int. Cl.
*G05B 11/01* (2006.01)
*G06F 1/00* (2006.01)
(52) U.S. Cl. ........................... 700/22; 713/300; 713/322
(58) Field of Classification Search .................... 700/22; 713/300, 322
See application file for complete search history.

(56) References Cited

U.S. PATENT DOCUMENTS

| 5,754,867 | A | 5/1998 | Walker |
| 7,085,944 | B1 | 8/2006 | Hamilton |
| 7,913,071 | B2* | 3/2011 | Mallik et al. ....................... 713/1 |
| 2002/0133241 | A1* | 9/2002 | Takahashi et al. ............... 700/22 |
| 2003/0030326 | A1* | 2/2003 | Shenai et al. .................... 307/21 |
| 2003/0125922 | A1 | 7/2003 | Grochowski et al. |
| 2003/0126479 | A1* | 7/2003 | Burns et al. .................... 713/300 |
| 2005/0132238 | A1* | 6/2005 | Nanja .............................. 713/300 |
| 2007/0033425 | A1 | 2/2007 | Clark |
| 2008/0141047 | A1* | 6/2008 | Riviere-Cazaux ............ 713/300 |

FOREIGN PATENT DOCUMENTS

EP    1338949 A1    8/2003
* cited by examiner

*Primary Examiner* — Kakali Chaki
*Assistant Examiner* — Sivalingam Sivanesan
(74) *Attorney, Agent, or Firm* — McAndrews, Held & Malloy, Ltd.

(57) ABSTRACT

An electronic device is provided with at least one functional unit (HB) performing a processing, wherein the functional unit (HB) receives a supply current (Isupply). A supply current monitor (SCM) is provided for monitoring the supply current (Isupply) to determine an average supply current (Iavg). A characterization unit (CU) is provided for determining a first relation between the averaged supply current (Iavg) and an operation frequency of the functional unit and/or for determining a second relation between a workload of the functional unit (HB) and the average supply current (Iavg) of the functional unit (HB). Furthermore, a slope calculation unit (SCU) is provided for determining the slope of the first and/or second relation. The operation of the functional unit (HB) is controlled according to the results of the slope calculation unit (SCU).

30 Claims, 3 Drawing Sheets

ELECTRONIC DEVICE AND METHOD DETERMINING A WORKLOAD OF AN ELECTRONIC DEVICE

FIELD OF THE INVENTION

The present invention relates to an electronic device as well as to a method for determining the workload of an electronic device.

BACKGROUND OF THE INVENTION

The workload of electronic devices or hardware units can be used to analyze the performance of the electronic devices or hardware units. If it is determined that the workload is low, the electronic device rarely executes its functionality and is mainly in an idle state, while if the workload is high, the electronic device mainly executes its functionality and is rarely in an idle state. According to the workload, functionality can be removed or added to accelerate or to slow the execution down. The workload of an electronic device can for example be defined as part of the total time of observation, in which the hardware or the electronic device executes some of its functionality. For processing devices like microprocessors, the workload corresponds to a number of clock cycles, during which instructions are executed. The workload may be expressed in percent. The workload may also be calculated based on a ratio of the execution time and the total time. The workload is typically determined by counting the total number of clock cycles within the observation and counting the clock cycles during which the electronic device performs an operation. By looking at inputs of an electronic device or a hardware unit, it can be detected whether an operation is executed. Furthermore, the detection of an operation can be performed based on the presence of any pending data or comments, or by inspecting the internal behavior of the unit to determine Data flows within the unit. Sometimes, the hardware unit may also compute the workload itself and output the result thereof.

However, it can be difficult to compute a workload of an internal behavior of a hardware block. Furthermore, it can be difficult to determine external communications of the hardware block as these communication as well as internal behavior has to be monitored and analyzed to determine the operation time and the idle time of the hardware unit. However, it should be noted that analyzing a hardware unit requires extra functional blocks which need to be incorporated into the system which may further increase the size of the system in terms of higher frequencies for processors or an additional hardware infrastructure.

SUMMARY OF THE INVENTION

It is therefore an object of the present invention to provide an electronic device as well as a method for determining the workload of an electronic device, which are able to determine the workload without adding a significant additional infrastructure to the electronic device.

This object is solved by an electronic device according to claim 1 as well as by a method for determining the workload of an electronic device according to claim 4.

Therefore, an electronic device is provided with at least one functional unit performing a processing, wherein the functional unit receives a supply current. A supply current monitor is provided for monitoring the supply current to determine an average supply current. A characterization unit is provided for determining a first relation between the averaged supply current and an operation frequency of the functional unit and/or for determining a second relation between a workload of the functional unit and the average supply current of the functional unit. Furthermore, a slope calculation unit is provided for determining the slope of the first and/or second relation. The operation of the functional unit is controlled according to the results of the slope calculation unit.

The invention also relates to a method for determining a workload of an electronic device. A processing is performed by at least one functional unit, wherein the functional unit receives a supply current. The supply current to the functional unit is monitored to determine an average supply current. A first relation between the average supply current and an operating frequency of the functional unit and/or a second relation between the workload of the functional unit and the average supply current of the functional unit are determined. A slope of the first and/or second relation is determined. The operation of the functional unit is controlled according to the results of the slope calculation.

The present invention relates to the idea to determine the workload of an electronic device or parts thereof by monitoring its supply lines. In other words, according to the workload functionality can be removed when the processor is overloaded or it can be added if the processor has room for additional functionality. In particular, the supply current is monitored to determine the workload of the electronic device or parts thereof. To determine the workload of an electronic device or parts thereof, the current-frequency relation is determined, and/or the workload-current relation is determined. The slope of the relation between the current-frequency and/or the slope of the relation of the workload/current frequency is examined. This can for example be done by oscillating the execution frequency to measure the supply current. Furthermore, a real-time operation time point is determined, which could also be done by oscillating the frequency. In other words, the average supply current needs to be monitored or measured. The measured supply current is analyzed to determine the workload of the electronic device or parts thereof. It is furthermore determined whether the electronic device or parts thereof operate in real time. The workload can be managed according to the analysis of the supply current and whether the electronic device or parts thereof operate in real time. The management of the workload may include adding or removing functionality, and switching on or off of hardware.

Preferred embodiments of the invention are defined in the dependent claims.

BRIEF DESCRIPTION OF THE DRAWINGS

These and other aspects of the invention will be apparent from and elucidated with reference to the embodiment(s) described hereinafter with reference to the drawings.

DETAILED DESCRIPTION OF EMBODIMENTS

Figure 1:
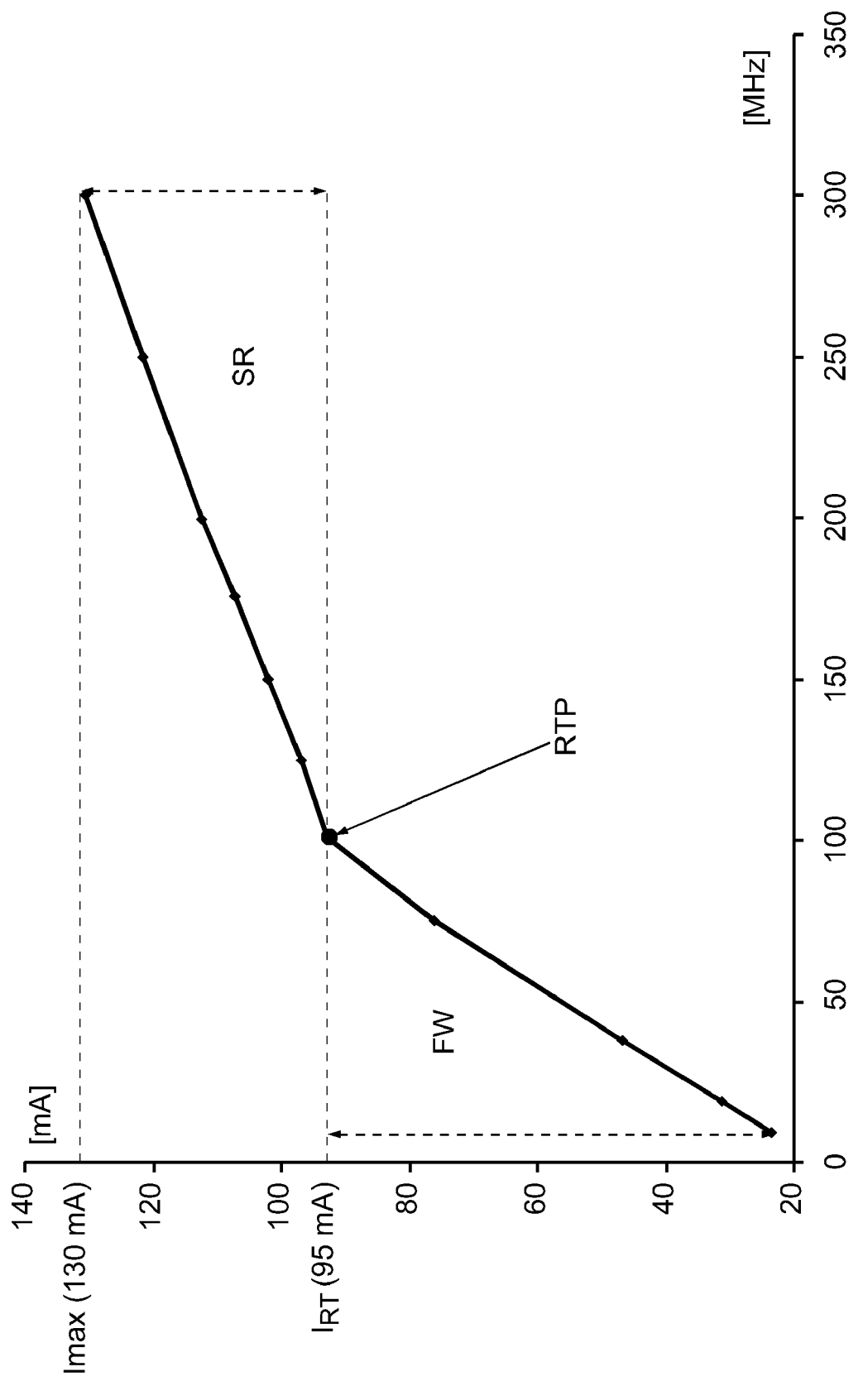
FIG. 1 shows a graph of a current-frequency relation of a processing unit according to the invention.

FIG. 1 shows a graph of a current-frequency relation of a processing unit. Merely as an illustrative example, the processor may be a TriMedia 3260 processor. In FIG. 1, the relation between the supply current of a hardware block and the operation frequency of the block is depicted. In particular, the average supply current Iavg is depicted. From FIG. 1 it can be seen that the average supply current is linearly proportional to the working frequency of the hardware block. In other words, each particular workload of a hardware block will result in a particular supply current. Therefore, if the supply current is determined, the corresponding value of the workload can be deducted. In FIG. 1 a real time point RTP is shown, which corresponds to the situation, where the processing unit operates in real-time.

Furthermore, from FIG. 1 it can be seen that the relationship between the operating frequency and the current has two slopes wherein the real time point RTP corresponds to the crossing point of the two slopes. The region FW left to the real-time point RTP corresponds to a full workload region while the region SR right of the real-time point RTP corresponds to a workload with free capacity.

Figure 2:
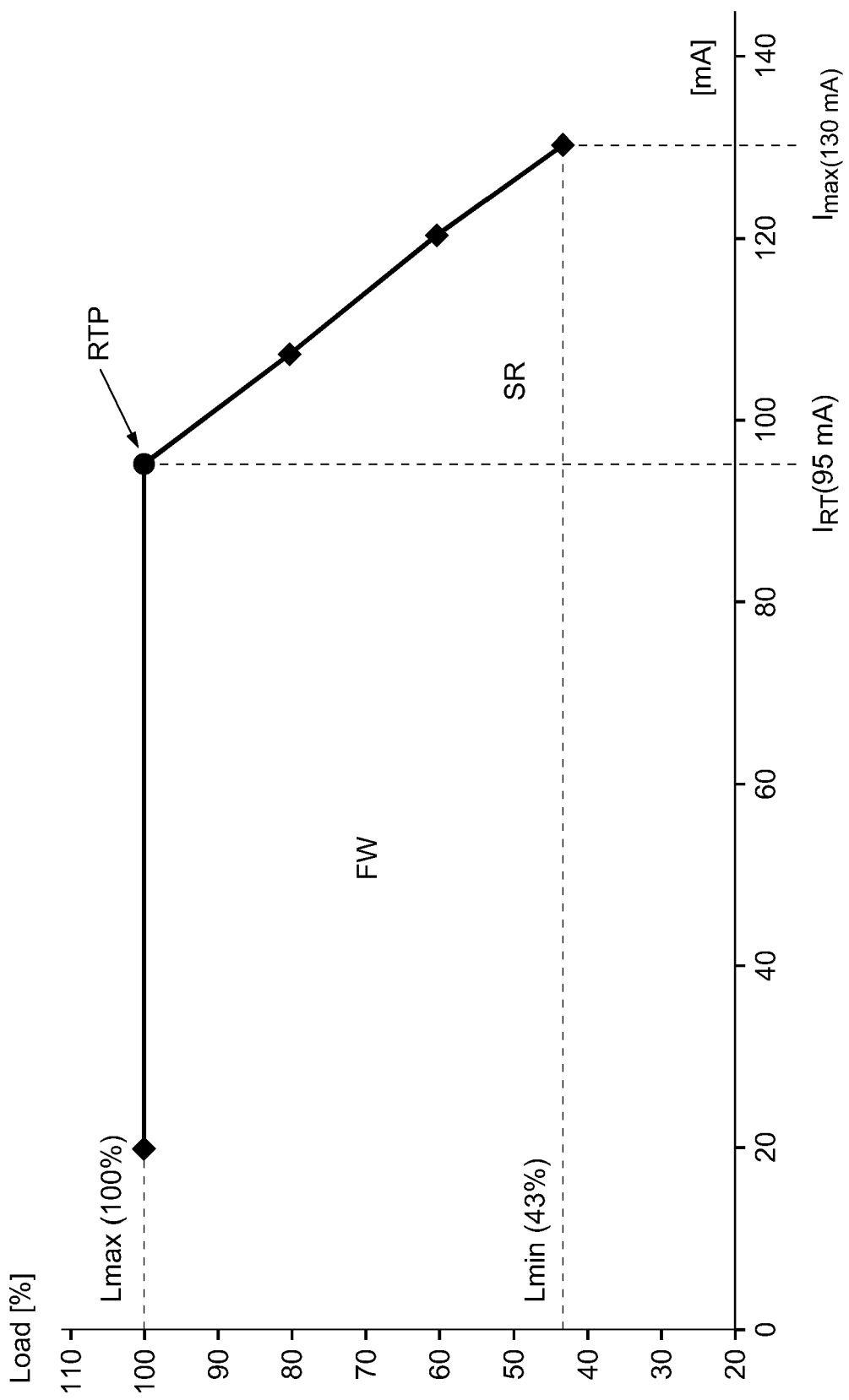
FIG. 2 shows a graph of a workload-current relation of a processing unit according to the invention.

FIG. 2 shows a graph of a relation between the average supply current and the workload of a hardware unit. The relation between the average supply current $I_{arg}$ and the workload can for example be determined by measurement. The workload as function of the supply current can be obtained by adjusting the supply current. Between 0 mA and $I_{RT}$ (current at the real-time point) the workload substantially corresponds to 100% (Lmax) wherein a minimum workload Lmin is reached at a current of Imax. If the minimum workload Lmin is known, for example, by a measurement in the hardware block, the workload as function of the supply current can be determined.

It should be noted that each processor or hardware block will have a specific current-frequency and workload-current characteristics. Furthermore, microprocessors or processing units may be characterized by two lines with two different slopes corresponding to a full workload region FW and a region SR where there is still workload available. Typically, the upper line of the current-frequency relation can be horizontal for hardware units which power down when they do not execute. The lower line of the current-frequency relation may be steep for hardware blocks which are switched off nor the entire required functionality can be executed.

It should be noted that a slope angle in the full workload region FW is bigger than the slope of the workload region SR. In other words, executing functionality appears to be more costly than executing idleness.

By detecting the angle of the slope in a current-frequency relationship or a workload-current relation, it can be determined whether the hardware block is operating in real time or if it is overloaded. Such information may be used for quality of service purposes.

Accordingly, the present invention shows an easy way to determine the workload of a hardware block and to determine whether the hardware block is working in real time or not. This can be performed by examining the supply lines of the hardware block.

Figure 3:
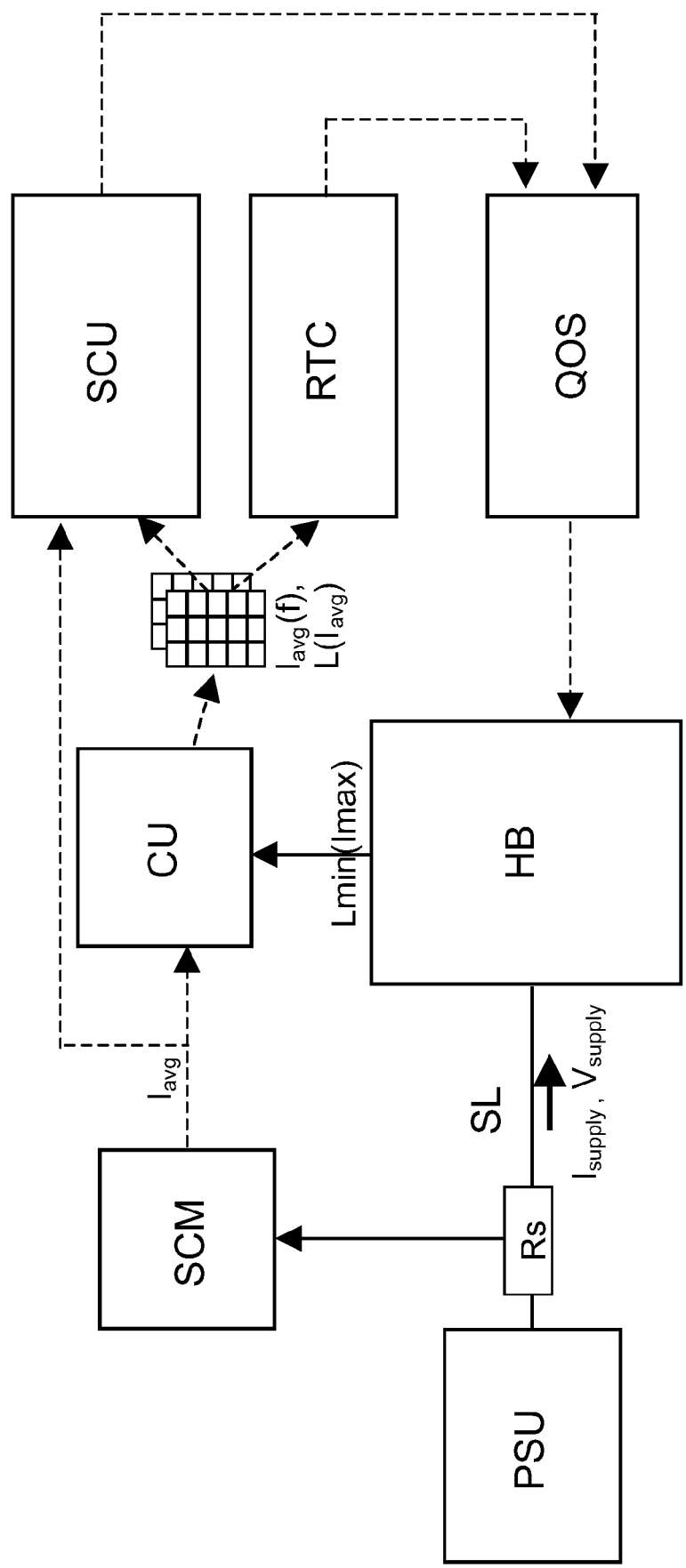
FIG. 3 shows a block diagram of an electronic device according to the first embodiment.

FIG. 3 shows a block diagram of an electronic device according to a first embodiment. The electronic device comprises a power supply unit PSU, a hardware block HB and supply lines SL coupled between the power supply unit PSU and the hardware block HB. The hardware block HB may correspond to a microprocessor, a functional unit or a further electronic device which is able to implement different functionalities. The power supply unit PSU, the supply lines SL and the hardware block HB constitute the core of the electronic device, which workload is to be determined.

Furthermore, additional functional units may be provided to implement the basic principle of the current invention. Therefore, a supply current monitor SCM is coupled to the supply lines SL for measuring the current which is supplied to the hardware block HB, i.e. it serves for performing current monitoring, current averaging or averaging time. Therefore, the supply current monitor SCM outputs an average supply current Iavg. Furthermore, a characterization unit CU, a sloped calculation unit SCU, a real time point calculation unit RTC, and a quality of service unit QUS is provided. The characterization unit CU serves to analyze the average supply current to determine the workload of the hardware block. The input of the characterization unit CU corresponds to the average supply current Iavg. The slope calculation unit SCU is used to determine if an average supply current corresponds to a workload in the full workload region or not. The real time point calculation unit RTC determines whether the monitored average supply current Iavg corresponds to a workload which corresponds to the real time point RTP or not. The result of the slope calculation in the slope calculation unit SCU and the results of the real time point calculations are output to the quality of service execution unit QOS. The quality of service execution unit QOS serves to control the hardware block to remove load, or to add further processing load to the hardware block. Furthermore, parts of the hardware block may be switched on and off according to the results of the quality of service execution.

In other words, the average supply current Isupply is monitored and analyzed to determine the workload of the hardware block. The average supply current Iavg is also analyzed to determine whether the hardware block HB is operating in real time or not. Based on the results of the analysis with respect to the workload and the real time operation of the hardware block, quality of the service policies can be implemented in order to manage the workload of the hardware block.

In the characterization unit CU a relation between the supply current and the operating frequency is determined. This relation may be determined off-line or online. If the relation is to be determined online, average supply current is measured for several execution frequencies. Moreover, a workload-current relation L(Iavg) can be performed off-line or online by computing the relation as described above.

In order to determine the slopes of the relation between the workload and supply current, first of all, it is determined which workload region corresponds to a monitored average supply current. Then, in order to determine the slopes of the relations, the executing frequency can be oscillated in order to measure average supply currents at different points in order to determine the slope of the relation. The real time point RTP can be determined by oscillating the execution frequencies and determine whether slopes with two different values can be found. If it is determined that a supply current corresponds to a full workload region, some of the functionality of the hardware block can be removed, until the hardware block operates in the real time point. Alternatively, the execution speed of the hardware block can be increased, if possible.

However, if the detected supply current corresponds to the second workload region with additional capacity, some of the functionality of the hardware block can be added until the hardware block operates in the real time point. Alternatively, the execution speed can be decreased, or the hardware block or at least parts thereof can be switched off. These quality of service policies can be performed either static or dynamic.

The quality of service policy is used to monitor the workload of a hardware block and to intentionally scale down the processing of the hardware block or at least parts thereof, if the hardware block is already operating at the real time point.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single . . . or other unit may fulfill the functions of several items recited in the claims. The mere fact that certain measures are recited in mutually different dependent claims does not indicate that a combination of these measured cannot be used to advantage.

Any reference signs in the claims should not be construed as limiting the scope.

The invention claimed is:

1. An electronic device comprising:
   a unit configured to determine a relationship between current and frequency supplied to a hardware block;
   a unit configured to determine a value of a slope of the relationship according to an operating current and an operating frequency of the hardware block; and
   a unit configured to adjust an operation of the hardware block according to the value of the slope.

2. The electronic device of claim 1, wherein the unit configured to adjust the operation of the hardware block is configured to adjust the operating frequency of the hardware block according to the value of the slope.

3. The electronic device of claim 1, wherein the unit configured to adjust the operation of the hardware block is configured to add or remove functionality of the hardware block according to the value of the slope.

4. The electronic device of claim 1, wherein the relationship comprises a first segment including a first slope and a second segment including a second slope.

5. The electronic device of claim 4, wherein the first segment corresponds to a region of full workload of the hardware block and the second segment corresponds to a region of available workload of the hardware block.

6. The electronic device of claim 4, wherein the unit configured to adjust the operation of the hardware block is configured to at least one of:
   adjust the operating frequency of the hardware block according to an intersection of the first segment and the second segment; or
   add or remove functionality of the hardware block according to the intersection of the first segment and the second segment.

7. The electronic device of claim 1, wherein the unit configured to determine the relationship of current and frequency supplied to the hardware block is further configured to oscillate the operating frequency of the hardware block to determine the relationship.

8. The electronic device of claim 1, wherein the relationship comprises current supplied to the hardware block as a function of frequency supplied to the hardware block.

9. An electronic device comprising:
   a unit configured to determine a relationship between current supplied to a hardware block and workload of the hardware block;
   a unit configured to determine a value of a slope of the relationship according to an operating current and an operating workload of the hardware block; and
   a unit configured to adjust an operation of the hardware block according to the value of the slope.

10. The electronic device of claim 9, wherein the unit configured to adjust the operation of the hardware block is configured to adjust the operating frequency of the hardware block according to the value of the slope.

11. The electronic device of claim 9, wherein the unit configured to adjust the operation of the hardware block is configured to add or remove functionality of the hardware block according to the value of the slope.

12. The electronic device of claim 9, wherein the relationship comprises a first segment including a first slope and a second segment including a second slope.

13. The electronic device of claim 9, wherein the first segment corresponds to a region of full workload for the hardware block and the second segment corresponds to a region of available workload for the hardware block.

14. The electronic device of claim 9, wherein the unit configured to adjust the operation of the hardware block is configured to at least one of:
   adjust the operating frequency of the hardware block according to an intersection of the first segment and the second segment; or
   add or remove functionality of the hardware block according to the intersection of the first segment and the second segment.

15. The electronic device of claim 9, wherein the unit configured to determine the relationship of current and frequency supplied to the hardware block is further configured to oscillate the operating frequency of the hardware block to determine the relationship.

16. The electronic device of claim 9, wherein the relationship comprises workload of the hardware block as a function of current supplied to the hardware block.

17. A method comprising:
   determining a relationship of current and frequency supplied to a hardware block;
   determining a value of a slope of the relationship according to an operating current and an operating frequency of the hardware block; and
   adjusting an operation of the hardware block according to the value of the slope.

18. The method of claim 17, wherein said adjusting an operation of the hardware block comprises adjusting the operating frequency of the hardware block according to the value of the slope.

19. The method of claim 18, wherein said adjusting an operation of the hardware block comprises at least one of:
   adjusting the operating frequency of the hardware block according to an intersection of the first segment and the second segment; or
   adding or removing functionality of the hardware block according to the intersection of the first segment and the second segment.

20. The method of claim 17, wherein said adjusting an operation of the hardware block comprises adding or removing functionality of the hardware block according to the value of the slope.

21. The method of claim 17, wherein the relationship comprises a first segment including a first slope and a second segment including a second slope.

22. The method of claim 17, wherein said determining a relationship of current and frequency supplied to the hardware block comprises varying the operating frequency supplied to the hardware block.

23. The method of claim 17, wherein the relationship comprises current supplied to the hardware block as a function of frequency supplied to the hardware block.

24. A method comprising:
- determining a relationship of current supplied to a hardware block and workload of the hardware block;
- determining a value of a slope of the relationship according to an operating current and an operating workload of the hardware block; and
- adjusting an operation of the hardware block according to the value of the slope.

25. The method of claim 24, wherein said adjusting an operation of the hardware block comprises adjusting the operating frequency of the hardware block according to the value of the slope.

26. The method of claim 24, wherein said adjusting an operation of the hardware block comprises adding or removing functionality of the hardware block according to the value of the slope.

27. The method of claim 24, wherein the relationship comprises a first segment including a first slope and a second segment including a second slope.

28. The method of claim 27, wherein said adjusting an operation of the hardware block comprises at least one of:
- adjusting the operating frequency of the hardware block according to an intersection of the first segment and the second segment; or
- adding or removing functionality of the hardware block according to the intersection of the first segment and the second segment.

29. The method of claim 24, wherein said determining a relationship of current supplied to a hardware block and workload of the hardware block comprises varying the operating frequency supplied to the hardware block.

30. The method of claim 24, wherein the relationship comprises workload of the hardware block as a function of current supplied to the hardware block.

* * * * *